United States Patent [11] 3,611,040

| | | | | |
|---|---|---|---|---|
| [72] | Inventor | John Desmond Ainsworth<br>Stafford, England | | |
| [21] | Appl. No. | 31,952 | | |
| [22] | Filed | Apr. 27, 1970 | | |
| [45] | Patented | Oct. 5, 1971 | | |
| [73] | Assignee | The English Electric Company Limited<br>London, England | | |
| [32] | Priority | Apr. 25, 1969 | | |
| [33] | | Great Britain | | |
| [31] | | 21,247/69 | | |

[54] APPARATUS FOR DERIVING A SIGNAL PROPORTIONAL TO A CHANGE-FUNCTION OF PHASE ANGLE
7 Claims, 3 Drawing Figs.

[52] U.S. Cl. .................................................. 317/20,
307/102, 328/133
[51] Int. Cl. ........................................................ H02h 3/26
[50] Field of Search.......................................... 317/20;
328/133; 321/38, 40; 307/102, 129

[56] References Cited
UNITED STATES PATENTS

| | | | |
|---|---|---|---|
| 3,095,534 | 6/1963 | Cockrell........................ | 321/40 X |
| 3,101,448 | 8/1963 | Costas........................... | 328/133 X |
| 3,450,991 | 6/1969 | Hornoch....................... | 328/133 X |
| 3,495,129 | 2/1970 | Donner et al. ................. | 317/20 X |
| 3,541,423 | 11/1970 | Kelley et al. .................. | 321/40 X |

Primary Examiner—James D. Trammell
Attorney—Misegades & Douglas

ABSTRACT: Apparatus for deriving an output signal proportional to a particular change-function of absolute phase angle of an alternating input signal comprises a phase comparator which generates the output signal as a result of comparison of the phase angle of the input signal with the phase angle of a signal from an oscillator. The phase angle of the oscillator output is controlled by a signal derived from an operational amplifier in response to the output signal.

APPARATUS FOR DERIVING A SIGNAL PROPORTIONAL TO A CHANGE-FUNCTION OF PHASE ANGLE

This invention relates to apparatus for deriving a signal proportional to a change-function of phase angle, and more particularly relates to such apparatus responsive to a change-function of the absolute phase angle of an alternating voltage derived from an AC system, as may be required to generate a signal for control of a generator field or a high-voltage direct current link to provide damping to the AC system.

From one aspect, the present invention consists in apparatus for deriving an output signal proportional to a change-function of absolute phase angle $\Phi$ of an alternating input signal, which change-function is substantially of the form $f(p)=K\Phi \cdot pT_1/(1+pT_1) \cdot pT_2/(1+pT_2)...pT_n/(1+pT_n)$ where $K$ is a gain constant, $T_1 - T_n$ are time constants and $p$ is the differential operator $d/dt$, said apparatus including an oscillator which generates oscillations having a phase angle controlled by a control signal, circuit means having a predetermined time-function response characteristic, said circuit means being responsive to said output signal to generate said control signal, and phase comparator means arranged to generate said output signal by comparison of the phase angles of said oscillations and of said input signal.

Preferably, the alternating input signal is polyphase ($m$-phase), a similar $m$-phase output being derived from the oscillator. In this instance $m$-phase comparators are provided for receiving the corresponding phase voltages from the AC input and the oscillator, the outputs from these phase comparators being commoned in a manner such that the resultant output signal is proportional to the sum of these individual outputs.

The phase comparators themselves may be constituted by multiplier circuits or electronic switches.

Apparatus according to this invention may conveniently be employed in circuits for damping power oscillations in AC systems embodying a generator field or a high-voltage DC link, the aforesaid signal being utilized in the control of the field or link. The apparatus is particularly advantageous over previously proposed schemes of this nature in so far as the measurement does not depend on the relatively small frequency changes which accompany any phase change but is based upon the use of a phase-locked oscillator to provide a temporary reference phase angle; further, the response time is very fast.

In order that the invention may be fully understood, one embodiment of the invention will now be described with reference to the accompanying drawing in which.

Figure 1:
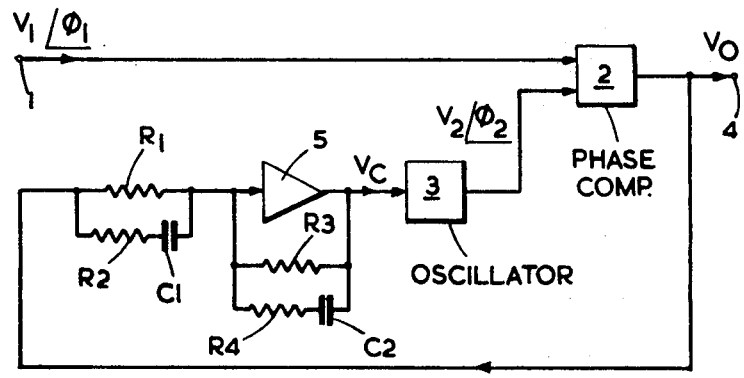
FIG. 1 illustrates a general form of apparatus according to this invention.

Referring now to FIG. 1, an alternating input voltage of amplitude $V_1$ and absolute phase angle $\Phi_1$ is applied via a terminal 1 to one input of a phase comparator 2. The other input of this comparator is applied from a voltage-controlled oscillator 3 which develops a sinusoidal voltage of constant amplitude $V_2$, phase angle $\Phi_2$, at a frequency dependent on its input control voltage $V_c$. In turn, this input voltage is developed via a feedback loop from the output ($V_o$) of the comparator at a terminal 4, this loop including a high-gain phase-reversing operational amplifier 5 having input components $R_1$, $R_2$, $C_1$ and feedback components $R_3$, $R_4$, $C_2$.

In operation, during a steady-state conditions at the nominal frequency ($f_o$) of the AC system, the oscillator has an output equal to this frequency but operates at a phase angle which differs from that of the AC system by $\pi/2$. Thus, under these conditions, the output ($V_o$) of the comparator 2 is zero. For sudden changes of phase in the input voltage from the AC system however, the oscillator phase remains temporarily unchanged and as a result a finite voltage appears at the output of the comparator, this output then controlling the oscillator via the feedback loop causing the phase of its output to tend towards that of the AC system with a lag dependent on the component values of the amplifier 5.

In particular, for finite values of the control voltage $V_c$ the oscillator develops an output frequency $f \Delta f$, where $\Delta f = K^1 \cdot V_c$ ($K$=gain constant), and for any frequency close to the nominal value the absolute phase $\Phi_2$ of the oscillator output is given by $$p_2 = 2\pi K^1 V_c$$

where $p$ is the differential operator $d/dt$.

With these inputs, the output $V_o$ of the comparator has a nominal DC component proportional to $K^{11} V_1V_2 \cos(\Phi_1-\Phi_2)$, which is the component wanted, together with an unwanted AC component at a frequency $2f_o$ which may be readily removed by filters.

Figure 2:
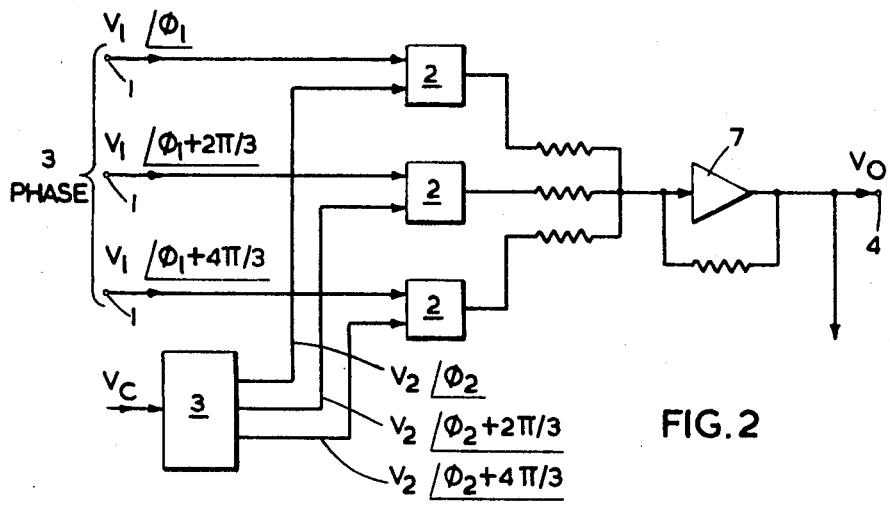
FIG. 2 illustrates a more particular form of this apparatus applicable to a three-phase system.

The provision of filters however increases the response time of the apparatus and to avoid this the circuit shown in FIG. 2 may be employed. In this Figure, the input voltage is derived from a three-phase system, as may frequently be the case, and three comparators 2 are used, the output from the oscillator 3 also being three-phase. By summating the three output voltages form the comparators through equal value resistors at the input to an operational amplifier 7, then, for balanced conditions, the AC components of the comparators cancel out one another, so that the resulting output $V_o$ is given by the DC component alone:

$$V_o = K^{111} V_1 V_2 \cos(\Phi_1 - \Phi_2)$$

or $$V_o = K^{111} V_1 V_2 \sin(\Phi_1 - \Phi_2 + \pi/2)$$

More particularly, the effective gain of the amplifier 5 is given by:

$$V_c = -(R_3/R_1)(1+pC_2R_4)(1+pC_1(R_1+R_2))V_o/(1+pC_1R_2)(1+pC_2(R_3+R_4))$$

If it is assumed that deviations of phase angle from the steady-state values are not too large, then it follows that $$\sin(\Phi_1 - \Phi_2 + \pi/2) = (\Phi_1 - \Phi_2 + \pi/2)$$

whereupon, from the relationships given above, it can be shown that:

$$V_o = (pA + p^2B + p^3C) \Phi_1/(1+pD+p^2E+p^3F)$$

where the constants $A$ to $F$ depend on the component values $R_1$ to $R_4$, $C_1$, $C_2$, the gain constants and the voltage amplitudes.

By suitable choice of component values, the transfer function from the latter expression may readily be arranged to be in the form $$f(p) = K\Phi \cdot pT_1/(1+pT_1) \cdot pT_2/(1+pT_2) \cdot pT_3/(1+pT_3).$$

This expression corresponds to a third order change function (i.e. $n= 3$). By suitable choice of the component values, certain of the terms may be made to vanish, so obtaining change functions of order $n=1$ or $n=2$, which may be more advantageous in certain particular applications.

If a higher order function is required i.e. greater than the third order given, this can be achieved by the addition of further components to the amplifier 5, the general expression being $$f(p) = K\Phi \cdot pT_1/(1+pT_1) \cdot pT_2/(1+pT_2)...pT_n/(1+pT_n)$$

The invention has been described above in a single-phase or three-phase arrangement; but of course in general an $m$-phase arrangement is possible, where $m$ is any positive integer, the input voltage and the oscillator each being $m$-phase, with $m$-phase comparators having their outputs summed to supply amplifier 7.

In particular with $m=2$, a saving in the number of components employed may be effected if the arrangement shown in FIG. 2 is reduced to the provision of two comparators, namely, by arranging for the three-phase input voltage to be converted to two-phase by a Scott-connected transformer and by arranging for the voltage-controlled oscillator to develop a two-phase output.

Figure 3:
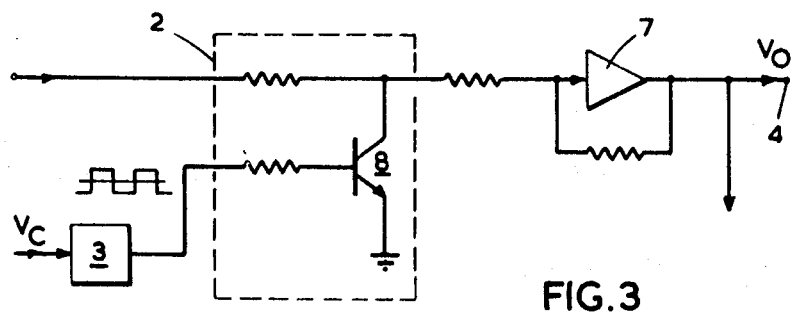
FIG. 3 illustrates one type of phase comparator which may be employed in the above apparatus.

In each of the embodiments described the comparator may be a multiplier designed in any one of the conventional electronic forms, but alternatively one simple form which this comparator may take is shown in FIG. 3.

As shown in this Figure, the output (square wave) from the voltage-controlled oscillator 3 is applied across the base-emitter path of a transistor switch 8 so that the AC input on the collector is periodically short-circuited to ground in accord with the square waveform, the input to amplifier 7 thus being proportional to the AC input voltage for one-half cycle of the square wave, and zero for the other half-cycle. With the phase of this waveform being $\Phi_2$ and the phase of the AC input $\Phi_1$ then the output voltage can be shown to have a mean component proportional to $V_1 \cos(\Phi_1 - \Phi_2)$, as before.

I claim:

1. Apparatus for deriving an output signal proportional to a change-function of absolute phase angle $\Phi$ of an alternating input signal, which change-function is substantially of the form $f(p) = K\Phi \cdot pT_1/(1+pT_1) \cdot pT_2/(1+pT_2)...pT_n/(1+pT_n)$ where $K$ is a gain constant, $T_1-T_n$ are time constants and $p$ is the differential operator $d/dt$, said apparatus including an oscillator which generates oscillations having a phase angle controlled by a control signal, circuit means having a predetermined time-function response characteristic, said circuit means being responsive to said output signal to generate said control signal, and phase comparator means arranged to generate said output signal by comparison of the phase angles of said oscillations and of said input signal.

2. Apparatus as claimed in claim 1, in which said phase comparator means comprises a multiplier circuit.

3. Apparatus as claimed in claim 1, in which said input signal is a $m$-phase signal and said oscillations are $m$-phase oscillations, $m$ being any positive integer, and in which said phase comparator means comprises $m$ multiplier circuits each responsive to one phase of the input signal and to a corresponding phase of the oscillations, said output signal being proportional to the sum of $m$ signals generated by the multiplier circuits.

4. Apparatus as claimed in claim 1, in which said oscillations are of square waveform, and in which the phase comparator means comprises electronic switch means which is operated by the square wave oscillations to produce said output signal having, for successive half-cycles of the oscillations, respectively, a zero value and a value proportional to the magnitude of said input signal.

5. Apparatus as claimed in claim 4, in which said input signals are $m$-phase signals and said oscillations are $m$-phase square waves, $m$ being any positive integer, and in which the electronic switch means comprises $m$ electronic switches, each switch being operated by a corresponding phase of the square wave oscillations.

6. Apparatus as claimed in claim 1, in which said input signal is transformed from a three-phase signal to a two-phase signal, and in which said oscillations are two-phase oscillations, the phase comparator means comprising two-phase comparator devices responsive, respectively, to one phase of the transformed input signal and to one phase of the oscillations.

7. Apparatus as claimed in claim 1, arranged in a circuit for damping electrical oscillations in an electrical power transmission system.